United States Patent [19]

O'Hanlon

[11] 4,214,574

[45] Jul. 29, 1980

[54] SOLAR HEAT COLLECTOR

[76] Inventor: Edward J. O'Hanlon, Assembly Point, Lake George, N.Y. 12845

[21] Appl. No.: 38,749

[22] Filed: May 14, 1979

Related U.S. Application Data

[63] Continuation of Ser. No. 717,447, Aug. 24, 1976, abandoned.

[51] Int. Cl.² ............................................. F24J 3/02
[52] U.S. Cl. .................................. 126/446; 126/450; 126/441
[58] Field of Search ............... 126/432, 434, 427, 447, 126/425, 448, 438, 450

[56] References Cited

U.S. PATENT DOCUMENTS

| | | | |
|---|---|---|---|
| 1,056,861 | 3/1913 | Walker | 126/448 |
| 2,490,659 | 12/1949 | Snyder | 126/432 |
| 2,705,948 | 4/1955 | Rostock | 126/434 |
| 3,039,453 | 6/1962 | Andassy | 165/136 |
| 3,919,998 | 11/1975 | Parker | 126/425 |
| 3,952,725 | 4/1976 | Edmondson | 126/447 |
| 3,986,491 | 10/1976 | O'Hanlon | 126/438 |
| 3,994,276 | 11/1976 | Pulver | 126/427 |

FOREIGN PATENT DOCUMENTS 446847   3/1949   Italy ........................................ 126/450

*Primary Examiner*—James C. Yeung
*Assistant Examiner*—Larry Jones
*Attorney, Agent, or Firm*—Pollock, Vande Sande & Priddy

[57] ABSTRACT

An exceptionally well insulated solar heat collector arranged to avoid heat leakage therefrom and operate substantially without any pump. This is mainly accomplished by self circulation of the working fluid, using accumulated solar heat.

7 Claims, 7 Drawing Figures

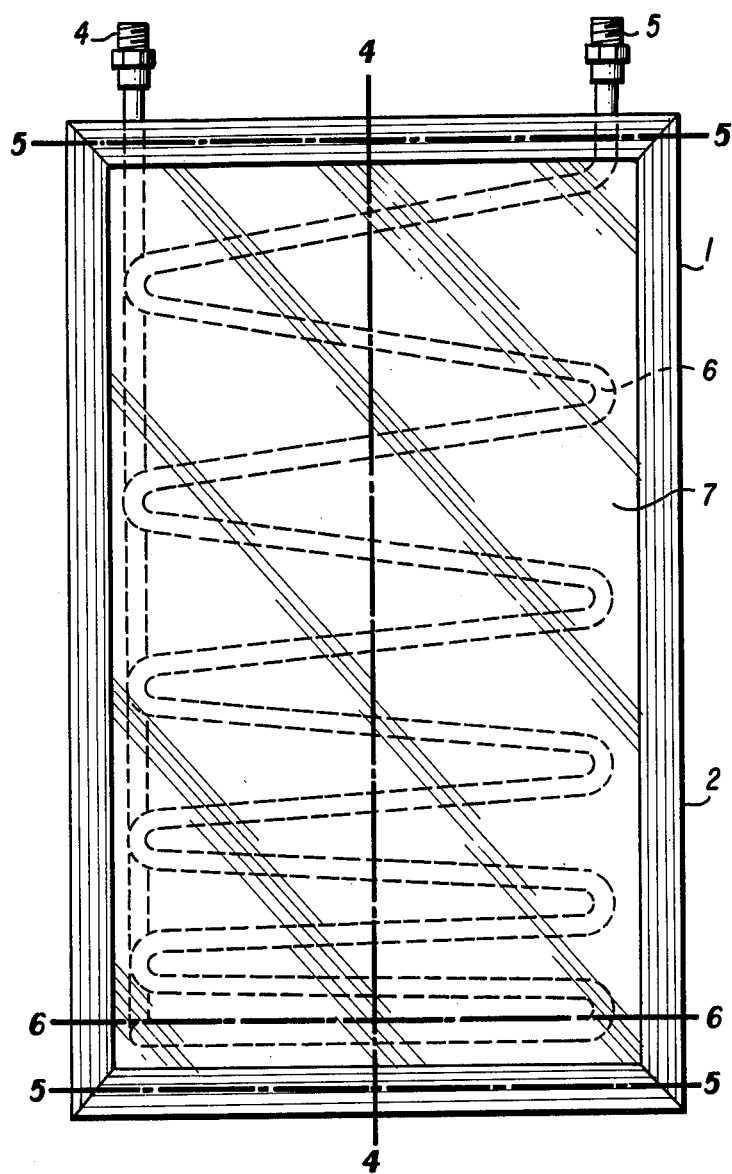
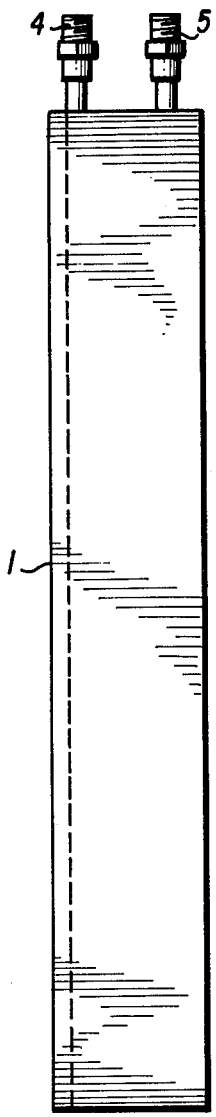
Fig. 1
Fig. 3
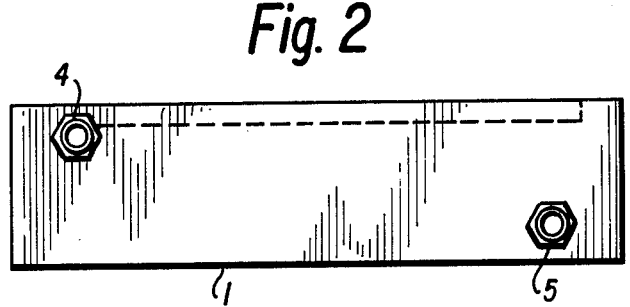
Fig. 2

SOLAR HEAT COLLECTOR

This is a continuation of application Ser. No. 717,447, filed Aug. 24, 1976, now abandoned.

In my present solar heat collector, the solar heat collecting element is a serpentined tube, positioned within a tray in a manner to be insulated against solar heat outflow by means of rigid plastic foam on one side of said serpentined tube and suitable closed in air spaces on the other side of same serpentined solar heat collecting tube.

To avoid the destruction of the rigid plastic foam by solar heat I separate the solar heat pick-up tube from the rigid plastic foam by means of closely pressed fiberglass fibres with a highly reflective metallic surface between the fiberglass fibres and the plastic foam. This reflective surface sends back through the fiberglass fibres solar heat that has penetrated the fibres, providing the serpentined tube with heat coming to it from both sides. Above the solar heat pick-up metallic tube is a closed air space insulating the tube and preventing the rapid escape of solar heat outward. In certain instances I employ a substantially flat sheet of glass or transparent plastic, to divide this same air space into two air spaces which definitely improves the prevention of solar heat escaping from my solar heat collector.

Because it is necessary once the collector has collected solar heat, to prevent its escape from the collector except through the working fluid flow, which picks up the solar heat as it enters the collector and carries it away from the collector after its flow therethrough is over.

In my five sheets of drawings I show seven figures.

FIG. 1 shows a plan view of my solar heat collector.

FIG. 2 is a view of the top side of my solar heat collector.

FIG. 3, is a side elevation of my solar heat collector.

Figure 7:
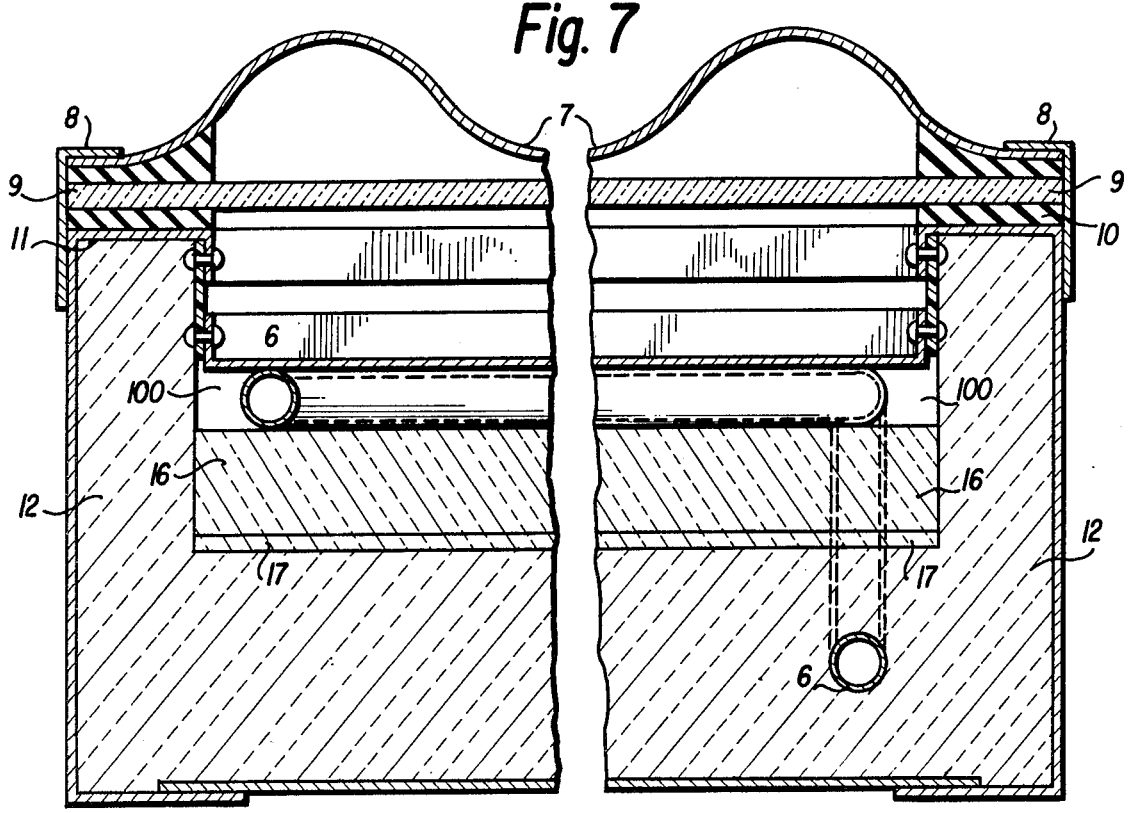

FIG. 7 would be a figure along the line 6—6 in FIG. 1 if FIG. 1 contained the extra flat sheet of translucent or transparent material 9 positioned under the outer sheet of reinforced corrugated transparent or translucent outer plastic sheet 7.

Within the figures the various parts of my heat collector invention are shown using the following numerals to distinguish each individual part.

Numeral 1 is the tray or box containing practically all of my solar heat collecting equipment. Numeral 2 is the resilient heat insulating material on each long side of my heat collector under the corrugated plastic sheet 7 that covers the heat collector. Numeral 3 is the uppermost end of my solar heat collector. Number 4 shows the working fluid tube 6 protruding above 3 where it enters heat collector tray 1. When the tube 6 leaves the interior of tray 1 it is shown here as numeral 5 above the upper side 3 of collector 1. The working fluid tube that carries the fluid picking up solar heat is designated through all the drawings by the numeral 6. The outer surface of the corrugated plastic sheet is numeral 7 in all figures. The corner bar holding the corrugated plastic sheet is here shown as numeral 8. The flat transparent or translucent sheet under the corrugated sheet 7 is numeral 9 positioned over solar heat collector side resilient heat insulator 10. Across the ends of the corrugated plastic sheet 7 are the ends of resilient material 18 especially shown in FIG. 5 . . . a section along 5—5 in FIG. 1.

Figure 5:
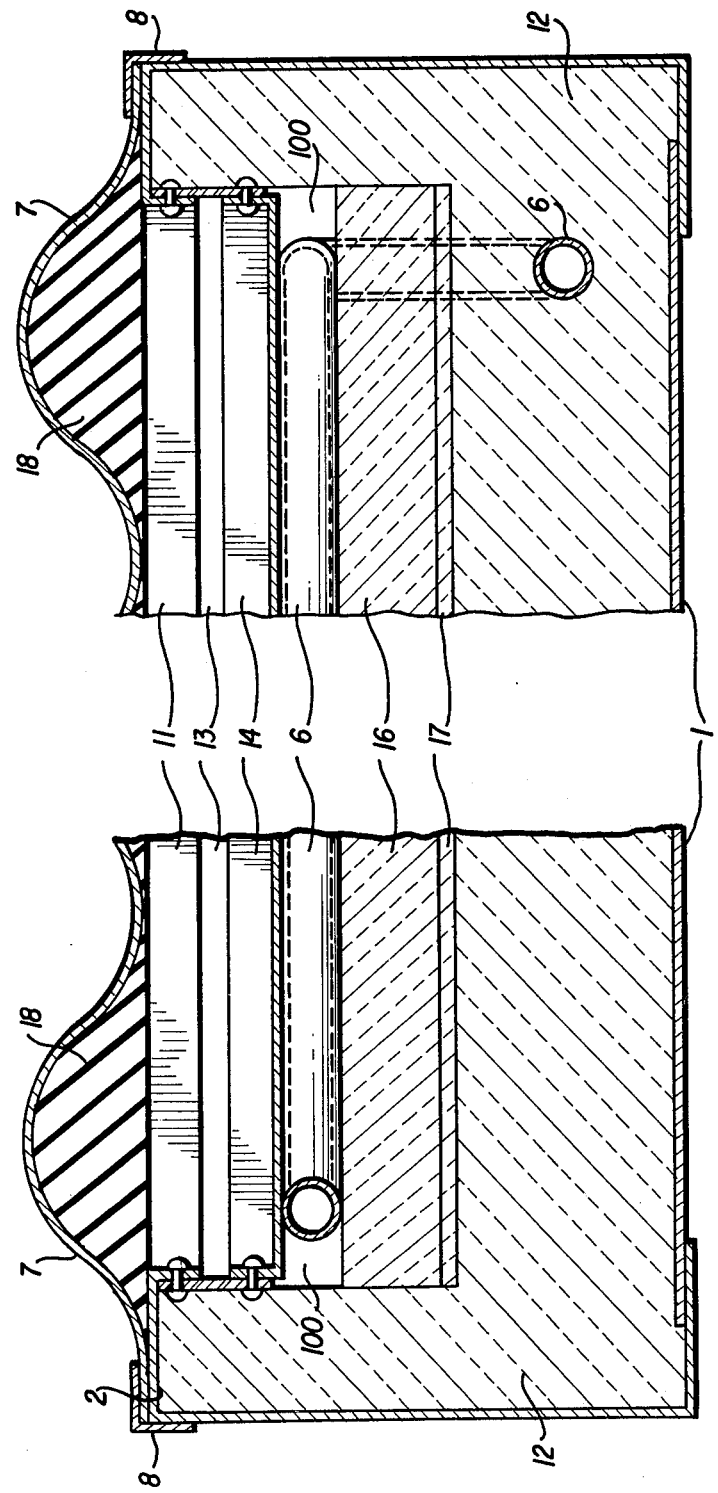
FIG. 5 is a section along the lines 5—5 of my solar heat collector as it is in FIG. 1.
Figure 6:
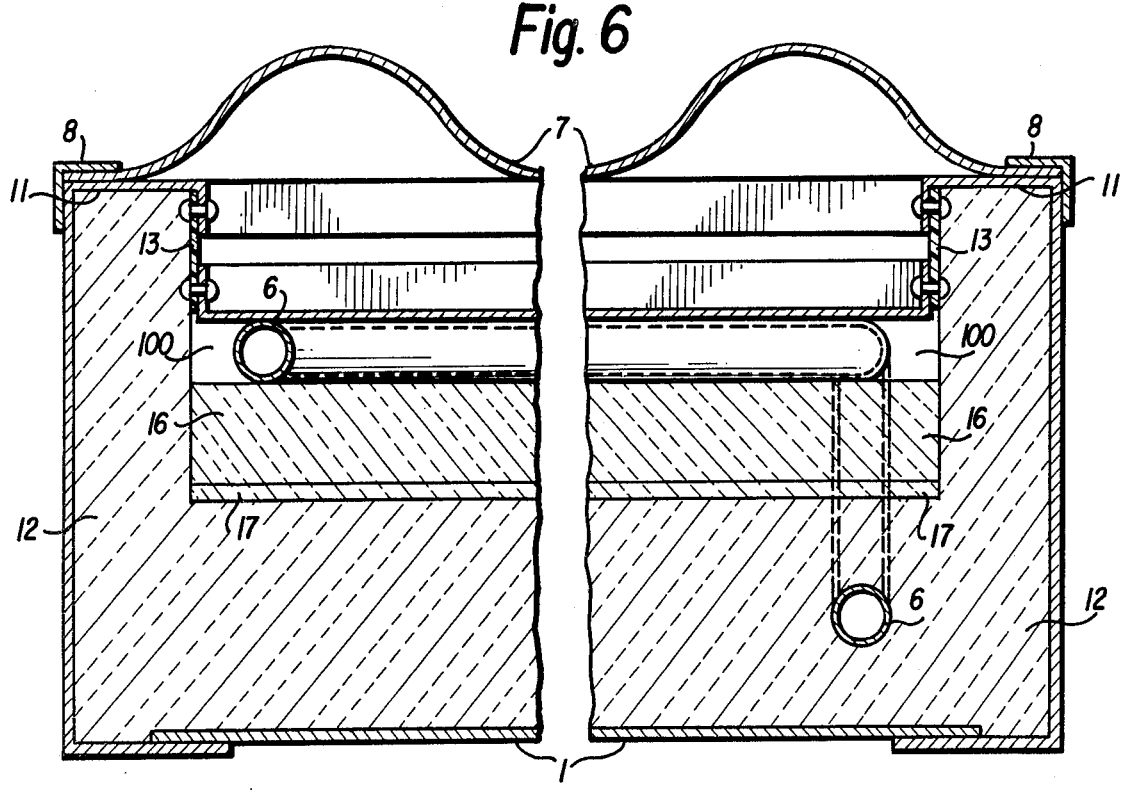
FIG. 6 is a section along the line 6—6 of my solar heat collector as it is in FIG. 1.

It is well within the perview of my present disclosure to place resilient rubber or rubber like material along the sides and under those same sides of my corrugated plastic sheet as it is detailed (without this sheet material 2) in FIGS. 5 and 6.

In FIG. 1 after tube 6 enters tray 1 and starts toward the lower end of tray 1, it is tightly held in the rigid plastic foam 12 that is preferably urethane foam such as polyurethane. At the low point in the drawing of FIG. 1, tube 6 is shown commensing to serpentine upward. Here it is no longer encased in the rigid foam but has entered the air space 100 in the middle of the solar heat container where much of the once collected solar heat is held.

My present invention pertains to a solar heat collector that is much more rapid in its solar heat collecting action than the speed of solar heat collection in any previous solar heat collectors that I have ever observed. It is more reluctant to lose the solar heat it has collected due to the various improvments I will presently explain, when any cloud passes over it and shuts off the direct rays of the sun providing the solar heat then at that time being collected.

The reason for this is the positioning of the air space 100 in which the working fluid tube 6 is located between the foam 12 and the metallic surface 14.

Numeral 13 is a most important part of my present solar heat collector. It is the narrow sheet of laminated plastic composite that is low heat conductivity, thus preventing the out flow of heat from my solar heat collector when the sun is not shining or providing heat to tube 6. On along its upper edge it is rivited to circular member 11 and along its lower edge along circular sheet 20 there is a flange of plate (metallic plate) 14 positioned above working fluid tube 6. The fact that tube 6 is underneath metal plate 14 and is brazed or soldered thereto again prevents heat from leaving tube 6 as fast as it would were it fastened to the top side of metal plate 14. However, my invention comprehends tube 6 fastened to either the top of plate 14 or the lower side of plate 14, even though it is shown in these drawings as fastened only to the under side of plate 14.

In FIG. 6 I do not show (as in FIG. 7) the resilient strip 2 running lengthwise the sides of my tray 1 but it is to be understood that it can be positioned under corner bar 8 just as it is shown in FIG. 7.

The fiberglass in all the Figures is designated as number 16 and is in a tightly packed manner between space 100 and shiney metal plate 17, which keeps the solar heat from causing the deterioration of plastic foam 12 below the plate 17.

FIG. 5 is a cut section along the lines 5—5 in FIG. 1. It shows how the ends of the lengthwise sheets of transparent or translucent corrugated heat hardened plastic sheet 7 is made tight along its ends to solar heat collector tray 1 under longitudinal corner bar 8.

FIG. 1 shows how tube 6 entering tray 1 at point 4 when it reaches the bottom of tray 1 turns and become a serpentine tube serpentining upward back and forth in swings progressively wider and wider apart until it reaches point 5 and emerges bringing its collected solar heat to a point beyond the solar heat collector.

Figure 4:
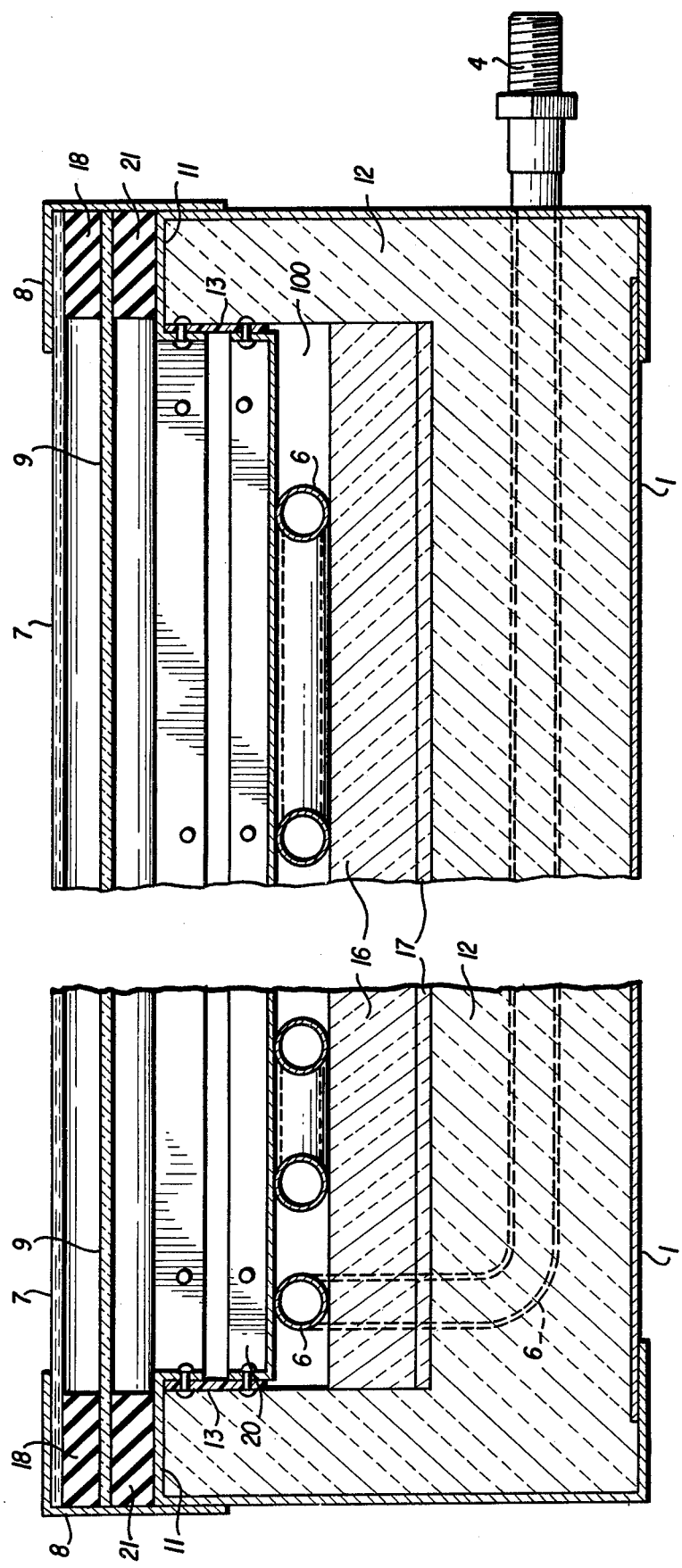
FIG. 4 is a section along the lines 4—4 of my solar heat collector as it is in FIG. 1.

If I choose to use an intermediate transparent plate of or film 9 as it is shown in FIG. 4 and FIG. 7 it is then that I use an extra resilient sheet of rubber or rubber like material as a separate packing member here designated as numeral 10.

In the present embodiment of my invention my top corrugated fibrous reinforced heat hardened plastic sheet is positioned lengthwise the tray 1 for increased rigidity of the entire solar heat collector. Thus it can be of increased length as its installation at any particular point of service may require.

Because of the every widening back and forth position of the serpentined tube 6, this is the reason my solar heat collector can be pumpless. This also permits it to operate at higher temperatures and allows the solar heated working fluid to be used in an expansion engine to produce mechanical power therefrom.

If my solar heat collectors are collecting solar heat near a steam power plant they can be placed in heat exchanging relation to the condensers of said power plant and can add solar heat to the condensate issuing from said nonsolar heated power plant. The practicality of this is determined by the thermodynamics as it then exists at said nonsolar power plant. There are a number of sources of fueless heat (geothermal, etc.) that can be used to generate fueless power. At just such fueless power plants my present solar heat collector can very easily come in handy . . . to reheat condensate.

Much thought is now being given to Fueless power plants of various kinds utilizing the power of steady chimney drafts, of hydraulic rams of flowing rivers, wave motors, water motors, etc. My present solar heat collectors can be used to back-up any of these other forms of fueless power plants as they may be operating where solar heat is economically collectable.

To these and other ends my inventions includes certain combinations of parts and heat and power collecting and producing processes . . . all of which are more carefully pointed out in the claims appended hereto.

I claim:

1. A solar heat collecting panel comprising a tray assembly having a bottom portion, a plurality of upstanding vertical sides and internal vertical partitions, said partitions having a length-wise slot, a corrugated transparent or translucent sheet having edges resting on resilient material mounted on said vertical sides, with said sheet and said resilient material held tightly within the boundaries of said tray, a darkened metallic solar heat absorbing surface arranged within said tray assembly, thermal insulating material extending between said tray and said darkened solar heat absorbing surface, said darkened surface having a tube fastened underneath thereon, said tube conveying a solar heat absorbing fluid, both ends of said tube protruding from one end of said tray, said tube serpentined within said tray, a first layer of heat insulative material positioned beneath said tube, a highly reflective surface extending beneath said first layer of heat insulative material, and a second layer of heat insulative material positioned between said reflective surface and said bottom portion of said tray.

2. A solar heat collecting panel according to claim 1, wherein said first layer of heat insulative material comprises a quantity of fiberglass tightly packed between said tube and said highly reflective surface.

3. A solar heat collecting panel according to claim 1, wherein said second layer of heat insulative material comprises a quantity of rigid plastic foam packed between said highly reflective surface and the bottom portion of said tray.

4. A solar heat collecting panel according to claim 3, wherein a further quantity of said rigid plastic foam forms side wall portions extending adjacent to the upstanding vertical sides of said tray assembly for preventing heat from escaping from within said solar heat collecting panel.

5. A solar heat collecting panel according to claim 4, wherein a sheet of laminated plastic composite is attached to the side wall portions of said rigid plastic foam.

said laminated plastic composite having an end portion attached to said darkened metallic heat absorbing surface, significantly reducing the transfer of solar heat between said darkened surface and the side wall portions of said rigid plastic foam in order to increase the amount of solar heat retained within the immediate vicinity of said tube, while preventing deterioration of said rigid plastic foam.

6. A solar heat collecting panel according to claim 1, wherein a metallic plate extends between said first and second layers of insulative material, said metallic plate having a shiney side facing said first layer of insulative material and forming said highly reflective surface for reflecting heat upwardly toward said tube.

7. A solar heat collecting panel according to claim 1, wherein a further corrugated sheet of transparent or translucent material extends across said tray assembly with said further corrugated sheet including end portions contacting resilient material fixidly supported on the upstanding vertical sides of said tray assembly.

* * * * *